(12) United States Patent
Tucker et al.

(10) Patent No.: US 8,099,716 B2
(45) Date of Patent: Jan. 17, 2012

(54) SERVICE STRUCTURED APPLICATION DEVELOPMENT ARCHITECTURE

(75) Inventors: Douglas Tucker, San Mateo, CA (US); James Steadman, Swansea (GB)

(73) Assignee: Ubiquity Software Corporation Limited, Wales (GB)

( * ) Notice: Subject to any disclaimer, the term of this patent is extended or adjusted under 35 U.S.C. 154(b) by 1578 days.

(21) Appl. No.: 11/288,026

(22) Filed: Nov. 28, 2005

(65) Prior Publication Data
US 2007/0124006 A1    May 31, 2007

(51) Int. Cl.
*G06F 9/44* (2006.01)
*G06F 1/16* (2006.01)
*G06F 3/00* (2006.01)

(52) U.S. Cl. ........ 717/121; 717/106; 717/107; 717/116; 717/120; 709/201; 709/228; 719/315; 719/318

(58) Field of Classification Search .................. 707/102, 707/103, 103 R, 200; 704/E15.047; 709/216; 717/100, 104, 106, 113, 108, 120
See application file for complete search history.

(56) References Cited

U.S. PATENT DOCUMENTS

| | | | | |
|---|---|---|---|---|
| 4,472,435 A | * | 9/1984 | Branca et al. | 514/630 |
| 5,680,619 A | * | 10/1997 | Gudmundson et al. | 717/108 |
| 5,734,837 A | * | 3/1998 | Flores et al. | 705/7 |
| 6,081,665 A | * | 6/2000 | Nilsen et al. | 717/116 |
| 6,098,072 A | * | 8/2000 | Sluiman et al. | 707/103 R |
| 6,134,706 A | * | 10/2000 | Carey et al. | 717/102 |
| 6,141,660 A | * | 10/2000 | Bach et al. | 707/103 R |
| 6,199,195 B1 | * | 3/2001 | Goodwin et al. | 717/104 |
| 6,360,229 B2 | * | 3/2002 | Blackman et al. | 707/103 R |
| 6,421,661 B1 | * | 7/2002 | Doan et al. | 707/3 |
| 6,539,398 B1 | * | 3/2003 | Hannan et al. | 707/103 R |

(Continued)

FOREIGN PATENT DOCUMENTS
WO PCT/US2006/045462 * 5/2007
(Continued)

OTHER PUBLICATIONS
"Frameworks for Component-Based Client/Server Computing", Scott M. Lewandowdki, [online],1998, pp. 3-27, [Retrieved from Internet on Sep. 16, 2011],<http://delivery.acm.org/10.1145/280000/274441/p3-lewandowski.pdf>.*

(Continued)

*Primary Examiner* — Thuy Dao
*Assistant Examiner* — Ziaul A Chowdhury
(74) *Attorney, Agent, or Firm* — Chapin IP Law, LLC; David W. Rouille, Esq.

(57) ABSTRACT

Systems and methods defining a service oriented object framework for use in providing an open application environment facilitating application function integration are shown. Embodiments provide object life management, platform resources management, and event management capabilities. A multi-layer architecture, defining object layers within an application container, may be used. A primary layer of such an architecture may comprise infrastructure objects providing foundational element blocks embodying protocol specific functions of the services that are to be built on top of a development container. An intermediate layer of such an architecture may comprise service objects providing service level functions. An upper layer of such an architecture may comprise business objects providing application orchestration element blocks defining the logical application created by combining the foregoing objects. Embodiments implement a framework that provides utilities that enable the object hierarchy to interact and function on top of a corresponding development container platform.

29 Claims, 2 Drawing Sheets

U.S. PATENT DOCUMENTS

| | | | |
|---|---|---|---|
| 6,601,234 B1* | 7/2003 | Bowman-Amuah | 717/108 |
| 6,658,644 B1* | 12/2003 | Bishop et al. | 717/102 |
| 6,912,520 B2* | 6/2005 | Hankin et al. | 1/1 |
| 6,985,905 B2* | 1/2006 | Prompt et al. | 707/102 |
| 7,055,134 B2* | 5/2006 | Schroeder | 717/120 |
| 7,096,220 B1* | 8/2006 | Seibel et al. | 1/1 |
| 7,272,818 B2* | 9/2007 | Ishimitsu et al. | 717/108 |
| 7,421,716 B1* | 9/2008 | Margulis et al. | 719/331 |
| 7,512,932 B2* | 3/2009 | Davidov et al. | 717/106 |
| 7,757,210 B1* | 7/2010 | Krueger | 717/120 |
| 7,774,790 B1* | 8/2010 | Jirman et al. | 719/318 |
| 2001/0047393 A1* | 11/2001 | Arner et al. | 709/216 |
| 2002/0002599 A1* | 1/2002 | Arner et al. | 709/219 |
| 2002/0199031 A1* | 12/2002 | Rust et al. | 709/315 |
| 2003/0088421 A1* | 5/2003 | Maes et al. | 704/270.1 |
| 2003/0225925 A1* | 12/2003 | Kusterer et al. | 709/315 |
| 2004/0034860 A1* | 2/2004 | Fernando et al. | 719/315 |
| 2004/0268298 A1* | 12/2004 | Miller et al. | 717/106 |
| 2005/0034098 A1* | 2/2005 | DeSchryver et al. | 717/101 |
| 2005/0240659 A1* | 10/2005 | Taylor | 709/217 |
| 2006/0015848 A1* | 1/2006 | Schwarzmann | 717/116 |
| 2006/0129979 A1* | 6/2006 | Fernando et al. | 717/113 |
| 2006/0143225 A1* | 6/2006 | Brendle et al. | 707/103 R |
| 2006/0144010 A1* | 7/2006 | Wolf | 52/750 |
| 2007/0011194 A1* | 1/2007 | Gurevich | 707/103 Y |
| 2007/0124006 A1* | 5/2007 | Tucker et al. | 700/90 |
| 2008/0077623 A1* | 3/2008 | Wood et al. | 707/200 |

FOREIGN PATENT DOCUMENTS

WO    WO2007622234 A3  *  11/2007

OTHER PUBLICATIONS

"Survey of Requirements and Solutions for Ubiquitous Software", Eila Niemela, [online], 2004, pp. 71-78, [Retrieved from internent on Sep. 16, 2011], <http://delivery.acm.org/10.1145/1060000/1052391/p71-niemela.pdf>.*

"RFID Meets Bluetooth in a Semantic Based U-commerce Environment", Michele Ruta et al, [online],2007, pp. 107-116, [Retrieved from Internet on Sep. 16, 2011], <http://delivery.acm.org/10.1145/1290000/1282124/p107-ruta.pdf>.*

"SoftDock: A Distributed Collaborative Platform for Model-based Software Development", Junichi Suzuki et al. [online], pp. 1- 5, [Retrived from Internet on Sep 16, 2011], <http://ieeexplore.ieee.org/stamp/stamp.jsp?tp=&arnumber=795265>.*

HP® invent, 5981-XXXXEN,Dec. 2003, Network and Service Provider Solutions, "Ubiquity SIP Application Server A solution brief from HP," pp. 1-4.

* cited by examiner

SERVICE STRUCTURED APPLICATION DEVELOPMENT ARCHITECTURE

TECHNICAL FIELD

The invention relates generally to open application environments and, more particularly, to application development architectures.

BACKGROUND OF THE INVENTION

Traditional applications have been built within isolated platforms, each performing a fixed set of application functions. For example, applications were defined and built as vendor specific applications, providing a well defined set of functions, with no opportunity to enhance the applications to provide functions beyond what was originally provided by the original design teams. Although such applications serve their original purpose, technological or market developments suggesting new functions to be implemented cannot be accommodated without appreciable modification to the applications (e.g., developing a new version of the full application). Moreover, such applications are limited in their ability to interact with other applications, perhaps providing complementary or related functions. Modifications to traditional applications can require substantial time (e.g., a year or more) to implement, test, and deploy.

Telecommunication service providers have begun to recognize that differentiated services are driving markets more so than the traditional price competition models. For example, telecommunication subscribers are often looking to groups of services that are available when selecting a service provider rather than solely price per minute. Accordingly, rather than specifying or building applications that perform a fixed set of application functions, service providers are evolving their application environments to support the delivery of groups of services, preferably closely bundled (i.e., providing seamless interaction between various functions), to enable them to be more competitive in the rapidly changing service focused market. In addition, applications for telephony services are likely to be increasingly made up of non-telephony media and features. The web services infrastructure is being embraced as a unifying application infrastructure to bring together service components (telephony and non-telephony) into a cohesive logical application creation and deployment environment.

Attempts have been made in the past to provide an open application environment facilitating application function integration for providing desired groups of services. For example, two recently introduced technologies, JAIN SLEE and PARLAY, have addressed issues with respect to the development of open environment applications.

JAIN SLEE is a service logic execution environment for the JAVA platform. JAIN SLEE provides an environment for a developer to create objects, link them together and build logical applications off of multiple individual building blocks. Accordingly, a developer may create self-contained objects that are deployed object by object in a container and those objects dynamically find the other objects that they need to interact with to provide their end application function. However, in JAIN SLEE all the objects are equal, so although the objects define service building blocks and may be mixed and matched as desired by a developer, it is up to the developer to explicitly structure the code for such uses. Moreover, JAIN SLEE is not particularly well focused toward providing telephony services that connect into a web services infrastructure. In addition to the development environment deficiencies, the JAIN SLEE deployment environment is bogged down in hierarchy, having many layers resulting in an overly abstracted deployment layer between the development container and the service network, and is not well suited to robust telephony applications. The JAIN SLEE standards, in addition to the foregoing deficiencies, do not fully support a web services infrastructure.

PARLAY provides a development environment similar to that of JAIN SLEE. That is, PARLAY provides a dynamic object based development environment and provides a framework for object life management. However, PARLAY, in addition to object life management, facilitates defining how the objects are to be made use of within the development environment and specifies its participation into a web services infrastructure. Accordingly, PARLAY has a well defined hierarchy of objects within its development environment that clarifies how developers need to build their applications to make them work in the environment. In addition, PARLAY is somewhat telephony focused, providing a developer with mechanism to overlay external policies on top of the applications in order to provide central way of dictating how resources in a service network are going to be used in relation to the applications put on the platform. However, PARLAY is only a development container, and therefore does not define any deployment platform or environment underneath it. Accordingly, the actual products that host/support PARLAY development environments are all unique, but with a well defined application environment on top of them.

The session initiation protocol (SIP) servlet container has been adopted by the IMS standards as the preferred SIP application server (A/S). However, the SIP servlet containers only address the deployment side of the problem. Accordingly, a SIP servlet container may be used to provide an open container that allows a developer to do object oriented design for telephony applications, but does not provide any special tools or architecture or infrastructure to better enable the developers to design such applications. Further, the SIP servlet container provides no facility to connect applications or services deployed on a SIP servlet container to the overall web services application infrastructure preferred by service providers.

It can be appreciated that an application environment may be thought of as including a development environment and a deployment environment. Although, both JAIN SLEE and PARLAY appear to provide useful application development environments as set forth above, both JAIN SLEE and PARLAY present difficulties when attempting to deploy telephony applications. In contrast, to JAIN SLEE and PARLAY, SIP servlet (JSR116) containers are well suited to deploying robust telephony applications. However, the standards governing SIP servlet containers have lacked a suitable development environment for creating and deploying distributed, logical applications.

From the above, it can be seen that developers and service providers are presented with problems in developing and deploying open applications for use in telephony. Such developers and service providers can select a deployment platform that meets their carrier requirements, but which does not provide a robust development environment, or they can select a development platform having better development tools for facilitating rapid service creation, but which suffers disadvantages with respect to the deployment environment.

BRIEF SUMMARY OF THE INVENTION

The present invention provides systems and methods defining a service oriented object framework (SOOF) for use in providing an open application environment facilitating application function integration for providing desired groups of services. Embodiments of a SOOF of the present invention bridge the foregoing services into a web services application infrastructure. An application environment provided according to embodiments of the invention includes a development environment in which the SOOF is disposed on top of a robust deployment environment. The application environment also preferably provides infrastructure for connecting services developed on top of the application environment seamlessly with a web services infrastructure supported by service providers. For example, in providing an open telecommunication application environment, such as to provide differentiated bundled to subscribers, a SOOF of embodiments of the invention may be implemented with respect to the deployment platform of a SIP servlet container. Additionally, a SOOF of embodiments of the invention may be implemented with respect to web services infrastructure, such as to provide high performance telephony services into a web services environment. As but one example of an implementation according to an embodiment of the present invention, a network operations center (NOC) may be bridged into a web services environment using a SOOF as described herein.

The foregoing SOOF of embodiments provides object life management, platform resources management, and event management capabilities, which are preferably optimized depending on the types of objects deployed within the container and whether they are inside the container or external containers and accessing the services within the SIP servlet container. Accordingly, a SOOF of embodiments of the present invention is optimized for the telephony performance that the SIP servlet container is known for.

A preferred embodiment SOOF provides a multi-layer architecture defining object layers within a container. A multi-layer object hierarchy of the present invention enables breaking an application up into smaller grained, functional objects that can be combined, either within the SOOF environment or through a web services infrastructure, together to make up the application whole. These finer grained objects of embodiments of the invention include SOOF infrastructure objects, SOOF service objects, and SOOF business objects. These objects are combined according to embodiments of the invention to provide one or more applications.

According to an embodiment, a primary layer of a multi-layer architecture comprises SOOF infrastructure objects providing foundation element blocks embodying protocol specific functions of the services that are to be built on top of a development container, such as a SIP servlet container. Such foundation element blocks of embodiments of the invention manage SIP dialogs, manage resource connections, etcetera. Accordingly, foundation element blocks of embodiments provide interfaces which isolate application developers from having to know details about the underlying network, and its resources, that they are writing services to.

A SOOF environment providing the aforementioned multi-layer architecture having SOOF infrastructure objects according to an embodiment of the invention creates a common foundation for all services by providing core blocks that enable a wide range of services, through utilization of appropriate ones of the foundation element blocks, without the need to modify or change the framework platform. A SOOF of embodiments of the invention is pluggable, however, to facilitate addition of new and/or revised foundation element blocks, such as to accommodate new services and/or devices.

An intermediate layer of a multi-layer architecture of an embodiment comprises SOOF service objects providing service level functions, such as audio mix control, announcement playback, data collection, data output, etcetera. Each service level function element block may utilize one or more foundation element blocks (e.g., one or more of the aforementioned SOOF infrastructure objects) to fulfill its function. Service level functions may be combined into a logical application through an orchestrating object, either within the SOOF environment or externally through a web services infrastructure.

An upper layer of a multi-layer architecture of an embodiment comprises SOOF business objects providing application orchestration which defines the logical application created by combining the foregoing objects. Application orchestration elements may utilize one or more service level function elements (e.g., one or more of the aforementioned SOOF service objects) to compose the logical applications they represent. Moreover, application orchestration elements may provide an interface to various services or other business logic, such as web services.

Embodiments of a multi-layered architecture implement a framework that provides utilities that enable an object hierarchy, such as that outlined above, to interact and function on top of a SIP application server platform. A SOOF of embodiments of the invention provide a plurality of utilities to create a common foundation for a wide range of services without the need to modify or change the framework platform. A SOOF of embodiments of the invention is pluggable, however, to facilitate addition of new and/or revised utilities, such as to accommodate new services and/or functions.

A preferred embodiment SOOF provides object management controlling the way in which the objects are loaded onto the platform and the interface that those objects use to register their function with the framework. According to embodiments of the invention, objects are dynamically loaded onto the host platform, such as a SIP application server platform. In operation according to an embodiment, an object is itself self-contained and defines its service function. Such an object registers itself to the central framework when the object is loaded into the platform, wherein registration by an object may include the object registering its service function, the number of interfaces it provides, the specific interface designations it provides to other objects, events the object generates and/or sinks, etcetera.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figures 2, 3:
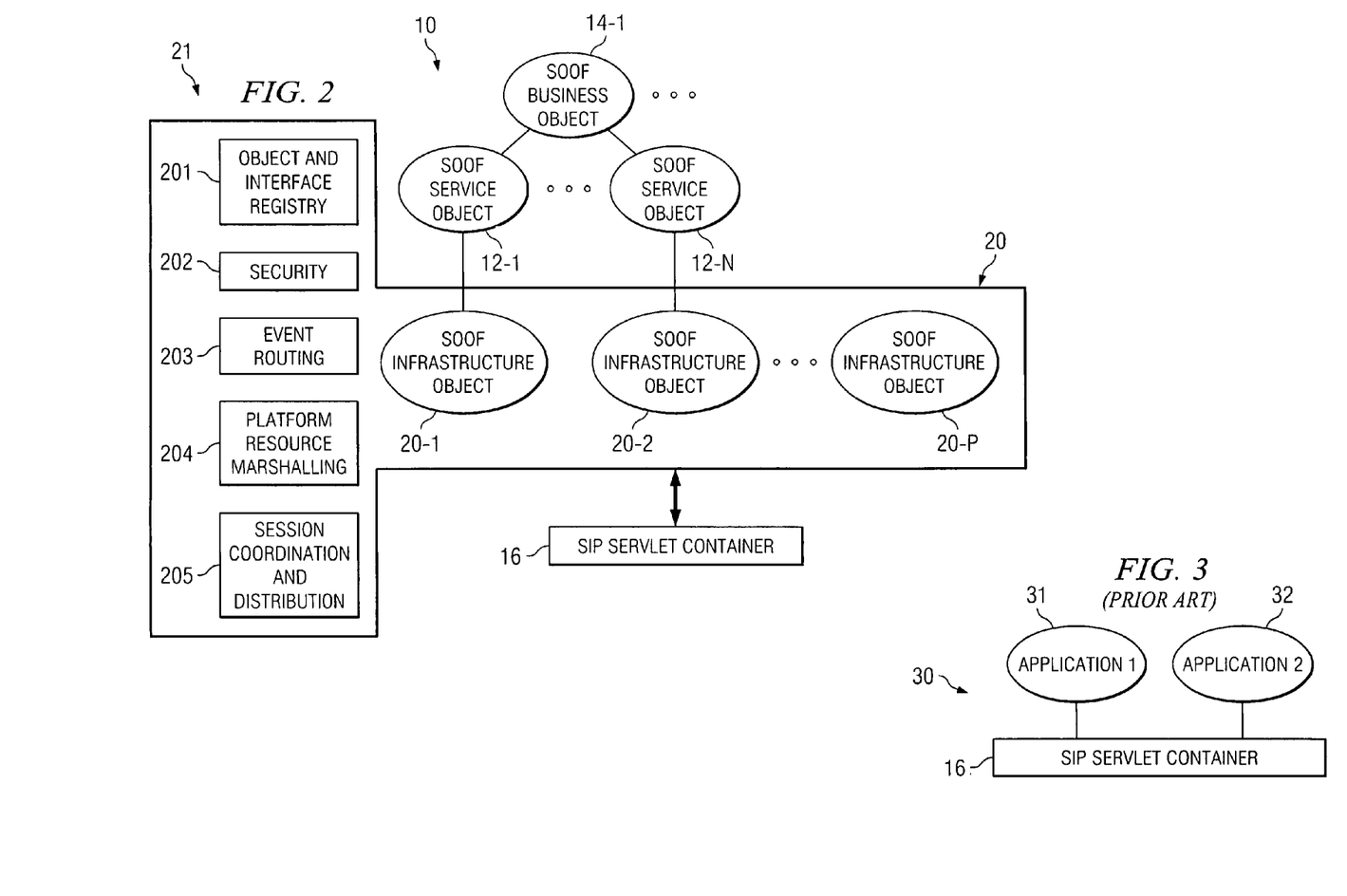
FIG. 2 shows detail with respect to an embodiment of the system of FIG. 1.
FIG. 3 shows a system providing application programs operable to provide defined functionality with respect to a SIP application server platform according to the prior art.

A brief discussion of the way in which applications are currently utilized is provided, with reference to FIG. 3, in order to aid in understanding concepts of the present invention. FIG. 3 shows system 30 providing application programs operable to provide defined functionality with respect to a SIP application server platform. Specifically, application program 31 and application program 32 are illustrated as being operable upon SIP application server platform 16. SIP application server platform 16 may comprise an open standard JSR116 compliant container that defines a SIP servlet container widely accepted in the industry.

Application programs 31 and 32 are written on top of a SIP servlet container embodied in SIP application server platform 16, perhaps using a software development kit, in the form of servlets. The aforementioned software development kit may be utilized to provide a way of extending the APIs to add new capabilities and new protocols that can be accessed through the API of the SIP servlet container. Accordingly, SIP application server platform 16 used in combination with such a software development kit may provide a SIP application server platform having enhanced features over a SIP application server platform alone.

Each of application programs 31 and 32 is compiled into a single servlet object and loaded onto SIP application server platform 16. These SIP servlet applications operate autonomously and provide independent connections to external services as defined by individual programmers. Neither the interaction of these SIP servlet applications, nor their interactions with external services, are governed by standard definitions. Once an application program is loaded on SIP application server platform 13 that application program has access to a series of application program interfaces (APIs), e.g., such as may be defined as part of JSR116, which are function calls across the boundary between the servlets and the host platform that allow the servlets to send SIP messages, receive SIP messages, change the content of SIP messages, etcetera.

An example of a simple application, such as may correspond to either of application programs 31 or 32, provides a back to back user agent where SIP elements outside of SIP application server platform 13, e.g., two SIP telephones, are placed in communication with one another and the application program provides desired functionality with respect to the communication. For example, application program 31 may operate to connect and log the call. Accordingly, when caller 1 places a call to caller 2, the call is routed into SIP application server platform 16. SIP application server platform 16 determines that the call needs to access the back-to-back user application, in this example application program 31, and passes a notification to application program 31 through an API. The notification may provide information to application program 31 that the call is coming in as well as information that was contained in the SIP invite. Application program 31 may analyze the information, make a determination that a call is to be connected to caller 2, pass a new invite to caller 2 in order to ring that caller's phone, and create a log of the call. Application program 32 may operate in a similar way to provide different and separate application functionality.

The foregoing application programs are written offline, compiled into a SIP servlet, and loaded on top of SIP application server platform 16. Accordingly, in typical practice application program 31 would be written in its entirety, compiled, and loaded onto SIP application server platform 16, application program 32 would be written in its entirety, compiled, and loaded onto SIP application server platform 16, and so on. Such applications are independent and isolated with respect to one another, typically unable to interact in any meaningful way. Resources within a service network, such as media servers, audio mixers, transcoders, etcetera, that are being used by such application programs cannot be shared effectively between the application programs. Accordingly, application programs of system 30 work as separate and autonomous application programs that happen to be disposed on a common platform. The foregoing applications also lack a platform coordinated means of connecting to a service provider's web services, distributed application environment.

The foregoing highlights some weaknesses of the SIP servlet container development environment. The SIP servlet container does not provide any mechanism to define a structure that will help developers successfully write an application on top of the platform. Moreover, the SIP servlet container does not provide a way of leveraging reusable code elements within the environment without duplicating code between independent applications. For example, if application program 31 and application program 32 have a common function, the code for this function must be recreated, or at least copied, between the two application programs, providing two unique but equivalent code functions between the application programs. In addition to an inefficient utilization of resources, such a configuration can result in increased development and support time. For example, if a bug is identified and fixed in the code for the common function in a first application program, the bug remains in the common function in the second application program. If the bug is to be repaired in the second application program, a developer must separately apply the fix to that code, or at least copy the code of the repaired function to the code of the second application program, and recompile and redeploys the second application program. Compounding the foregoing difficulties, there may be changes made with respect to one application program which are not pertinent to the other application program, thus presenting uncertainty and difficulty in management with respect to revising common code between the various application programs. Also, current SIP application server systems do not provide a well defined method of connecting applications or services developed or deployed within a SIP application server to the overall web services, distributed application environment preferred by service providers.

Figure 1A:
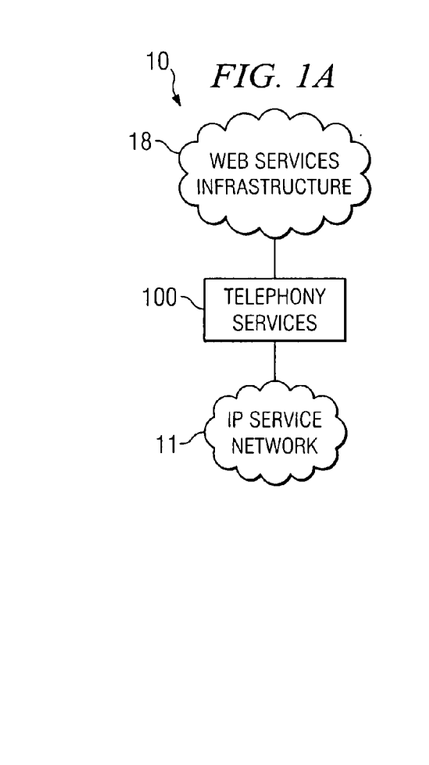
FIGS. 1A and 1B show a system adapted according to an embodiment of the present invention to provide application programs operable with respect to a SIP application server platform.
Figure 1B:
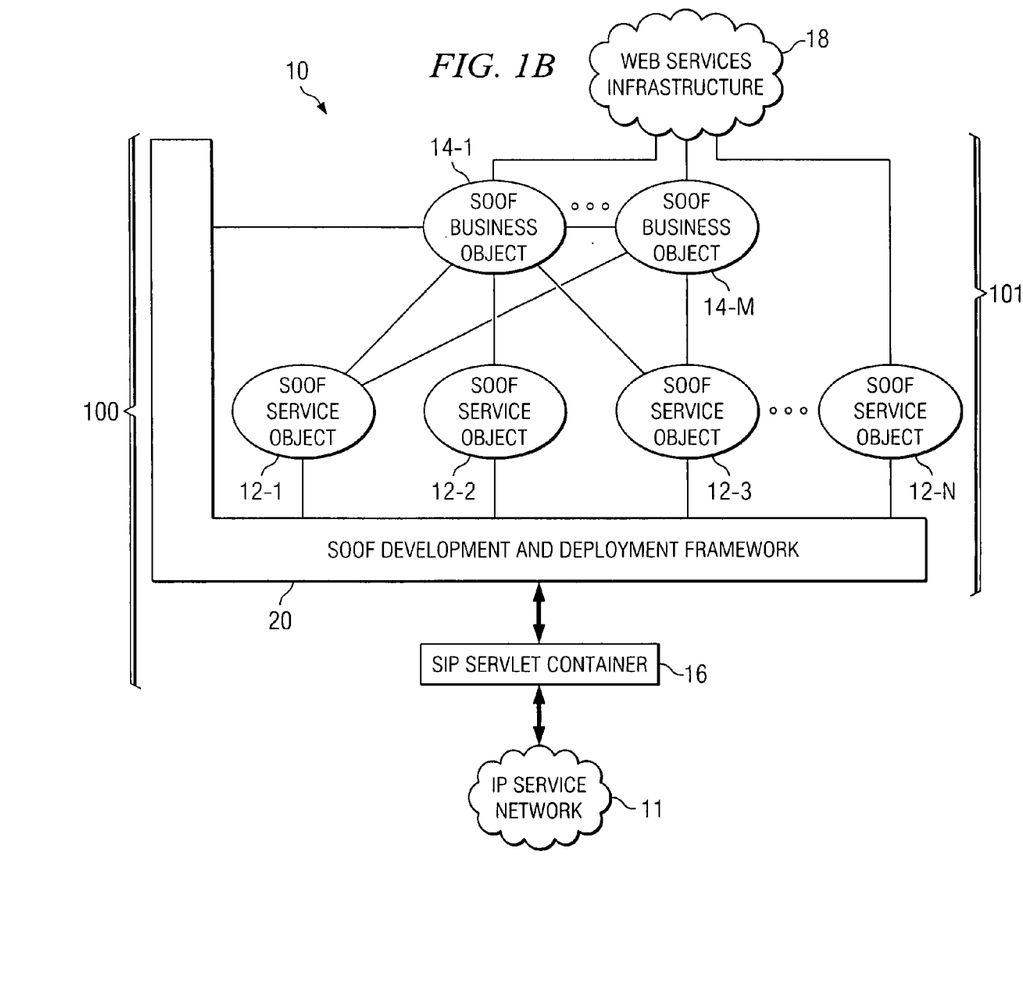

Turning now to FIGS. 1A and 1B, a system adapted according to an embodiment of the present invention to provide application programs operable with respect to a SIP application server platform is shown. FIG. 1A shows system 10 including telephony services 100 in communication with IP service network 11 to provide telephony services thereto. System 10 of FIG. 1A is further in communication with web services infrastructure 18 to interface with various services or other business logic provided thereby. Accordingly, telephony services 100 of embodiments of the invention may provide desired groups of telephony services, whether standalone, utilizing services of web services infrastructure 18, utilizing services of IP service network 11, or combinations thereof.

FIG. 1B shows additional detail with respect to telephony services 100 of an embodiment of the invention. Telephony services 100 of the embodiment illustrated in FIG. 1B includes SIP application server platform 16 upon which application environment 101 providing a SOOF according to the concepts of the present invention is deployed.

System 10, implementing application environment 101, of the illustrated embodiment provides a multi-layer object hierarchy that enables a developer to break application programs into smaller grained, functional objects that together make up one or more application programs. Functional objects of the illustrated embodiment include SOOF business objects 14-1 through 14-M and SOOF service objects 12-1 through 12-N. SOOF business objects and SOOF service objects of embodiments of the present invention may be coded by a developer in a suitable object oriented language, such as JAVA, using a development environment of the host container, e.g., SIP servlet container, as may be enhanced using a software development kit. Accordingly, a developer may readily create objects for providing desired functions for use with system 10.

The lowest layer of the illustrated multi-layer object hierarchy comprises SOOF development and deployment framework 20, which is shown in further detail according to an embodiment in FIG. 2. Accordingly, application framework 101 of the illustrated embodiment comprises SOOF business objects 14-1 through 14-M, SOOF service objects 12-1 through 12-N, and SOOF development and deployment framework 20. SOOF development and deployment framework 20 of a preferred embodiment is provided as a base layer to application framework 101, upon which a developer creates and deploys SOOF service objects and SOOF business objects to define desired application programs. SOOF development and deployment framework 20 of embodiments of the invention provides a pluggable framework in which various foundational element blocks and/or service and utility elements may be introduced, such as to accommodate future needs, development, technological advances, etcetera.

SOOF development and deployment framework 20 of preferred embodiments provides a lowest common denominator functionality and control with respect to external protocols or interfaces to application framework 101. SOOF development and deployment framework 20 also preferably provides the basic operations to enable management and control of objects within application framework 101. For example, SOOF infrastructure provides mechanisms to control how objects (e.g., SOOF business objects 14-1 through 14-M and SOOF service objects 12-1 through 12-N) get loaded into application framework 101, how the objects can find each other within application framework 101, how the objects connect to each other and make use of functions provided by the objects, and how the objects interact with underlying SIP application server platform 16 and thus IP service network 11.

In operation according to embodiments of the invention, SOOF development and deployment framework 20 provides external interface and protocol functions for an application of application framework 101. The external interface and protocol functions provided by SOOF development and deployment framework 20 may be made use of by SOOF service objects 12-1 through 12-N. For example, each SOOF service object may provide a service level function, such as audio mix control, announcement play back, interactive voice response (IVR) input control, screen functions, etcetera, that utilize interface and protocol functions of SOOF infrastructure to provide an application function. SOOF business objects 14-1 through 14-M, such as may utilize various features and functionality of web services available from web services infrastructure 18, preferably provide the overall definition of logical application programs that are created combining the objects of application framework 101. Accordingly, SOOF business objects 14-1 through 14-M may be thought of as providing an orchestration layer of the application programs. A SOOF business object of embodiments of the invention may utilize one or more SOOF service objects 12-1 through 12-N to provide application program functions. Likewise, a SOOF service object of embodiments may utilize one or more interface and protocol functions of SOOF development and deployment framework 20. A particular application program may thus be defined by cooperating ones of SOOF business objects 14-1 and 14-M, SOOF service objects 12-1 through 12-N, and interface and protocol functions of SOOF development and deployment framework 20.

SOOF service objects of embodiments can be exported directly to web services infrastructure 18 for orchestration into logical applications formed at the web services infrastructure layer of the service provider application infrastructure. Accordingly, a SOOF environment of embodiment of the present invention provides local orchestration through business objects on the SOOF platform, wherein the business object can export a service interface to the web services infrastructure (preferably providing a real-time macro service built from course grained service components), and the SOOF service components can be exposed individually to the web services infrastructure.

Taking an application such as audio conferencing as an example, an audio conferencing application may be built up in the development environment of embodiments by providing particular SOOF service objects with desired core functions, such as audio mixing, announcement, IVR input control, and/or other desired functions, such as conference coordination, to provide the pieces for an audio conference application. For example, each of the aforementioned functions may be provided by a separate one of SOOF service objects 12-1 through 12-N. One or more SOOF business objects, that operate to combine or invoke the aforementioned SOOF service objects according to business logic or rules, is provided to define operation of an audio conference application using the SOOF service objects. This logically formed application that is contained within the SOOF environment may optionally export a service interface to web services infrastructure 18 for inclusion in a larger logical application involving external application environments orchestrated through web services infrastructure 18.

According to embodiments of the invention, one or more of SOOF business objects 14-1 through 14-M define one or more application programs on application framework 101. Such application programs may each make use of core SOOF service objects that are deployed in application framework 101. Accordingly, the code of a particular SOOF service object may be utilized in multiple different application programs, although only a single occurrence of the code providing the desired functionality need be created, managed, updated, etcetera. Additionally or alternatively, may make use of SOOF service objects adapted to provide functionality unique to the particular application. Additionally, the services and logical applications created and contained within the SOOF environment can be made available to web services infrastructure 18 for inclusion in a larger, externally orchestrated logical application. Accordingly, unique functionality may be provided with respect to a desired application program with a minimum amount of additional coding, management, etcetera due to the granularity of the SOOF service objects of preferred embodiments.

From the above, a benefit of embodiments of the present invention is realized in that where a bug is fixed or other alteration made to a particular SOOF service object, such as an audio mix operation that is being used the audio conferencing application of the foregoing example and a call recording application, the SOOF service object may be replaced to implement the fix or alteration in each such application. Such an embodiment avoids a need to regression test all of the functions of the affected applications, perhaps resulting in only a function corresponding to the replaced SOOF service object being regression tested. Accordingly, embodiments of the invention contain problems within a field serviceable SOOF service object element.

According to embodiments of the invention, SOOF service objects are individually versioned for tracking and are registered with SOOF framework. Accordingly, SOOF business objects can selectively implement revised versions of SOOF service objects. For example, a SOOF business object may be set to automatically utilize new versions of a SOOF service object as those versions become available within application framework 101 or to sequence to a new version of a SOOF service object over time. Alternatively, a SOOF business object may be set to utilize a particular version of a SOOF service object, perhaps until manually controlled to utilize another version of a SOOF service object.

SOOF business objects of embodiments of the present invention may readily be created to combine various functions provided by existing service objects and/or the SOOF infrastructure into new service offerings. For example, according to embodiments of the invention, a developer may code business logic in an object oriented language, such as JAVA, to utilize functionality of a plurality of SOOF service objects, originally deployed to provide a different application, in order to provide a new service offering. Alternately SOOF business objects can be developed through text based scripting languages. Such new service offerings may utilize one or more SOOF service objects which are not otherwise available. For example, although using a plurality of existing, perhaps core, SOOF service objects, a SOOF business object may implement functionality not available from the SOOF service objects of application framework 101. Accordingly, the developer may code function logic in an object oriented language, such as JAVA, to provide the desired functionality as a new SOOF service object. Development time for such a new application is significantly reduced because existing functionality is highly leveraged and only that functionality not otherwise already available need be developed, tested, deployed, etcetera.

Although not shown in FIG. 1B, embodiments of the present invention may implement hierarchical configurations within various types of objects. For example, a SOOF business object may be developed which combines a plurality of other SOOF business objects in defining a desired application program. Likewise, a SOOF service object may be developed which combines a plurality of other SOOF service objects in providing desired functionality. Such configurations may thus employ higher level SOOF business/SOOF service objects utilizing lower level SOOF business/SOOF service objects.

Directing attention to FIG. 2, detail with respect to a preferred embodiment of SOOF development and deployment framework 20 is shown. The embodiment of SOOF development and deployment framework 20 shown in FIG. 2 includes foundation element blocks comprising SOOF infrastructure objects 20-1 through 20-P. SOOF infrastructure objects of embodiments of the invention form the primary functional pieces that facilitate simplified building of services, using SOOF service objects of preferred embodiments, and by extension applications, using SOOF business objects of preferred embodiments, in the application framework. Accordingly, SOOF infrastructure objects 20-1 through 20-P contain the expert knowledge used to interact with external protocols and external system products on behalf of the application program. SOOF service objects of embodiments of the invention may utilize one or more SOOF infrastructure objects in providing desired application functionality.

Application programs, and the developers creating application programs, within application framework 101 do not need to know how to make calls to particular resources, how various brands or configurations of resources differ, etcetera, because the actual application is insulated from this level of interaction by one or more SOOF infrastructure object. An application need only know a function to be performed according to embodiments of the invention in order to invoke the appropriate SOOF infrastructure object to establish the appropriate interface or employ the appropriate protocol to achieve the function.

SOOF infrastructure objects of embodiments of the invention may provide one or more interfaces and/or protocols. SOOF infrastructure objects are preferably themselves versioned as an object that provides a function or functions. Moreover, SOOF infrastructure objects preferably include versioning with respect to interfaces and/or protocols provided thereby. Accordingly, embodiments of the invention provide an easily managed technique for migrating functions and upgrading the objects without breaking existing applications in the application framework.

For example, an interface in a SOOF infrastructure object may include multiple interfaces, such as interfaces A and B. Interface A, interface B, and the SOOF infrastructure object may each be initially, separately designated as version 1. An application may be built and deployed using the interfaces of this SOOF application, perhaps with the constraint that interface B is critical to the application's operation and a different version of interface B is not to be implemented with respect to the application without suitable testing. However, additional functions may later be added to interface A, or patches or fixes made thereto. The revised interface A may be designated as version 2 and the revised SOOF infrastructure object including interface A version 2 and interface B version 1 may be designated version 1.5. The original application need not use the new interface A functionality and may continue to use the version 1 of the SOOF infrastructure that it was built to. However, interface A in the above example has not been identified as critical and thus it may be desirable to implement interface A version 2. SOOF infrastructure object version 1.5 in the foregoing example continues to employ interface B version 1, thus allowing the original application to implement SOOF infrastructure object version 1.5 without violating operational constraints established with respect to the application.

Although embodiments of SOOF infrastructure objects have been described above with reference to providing interfaces and/or protocols utilized with respect to resources external to application framework 101, it should be appreciated that interfaces and/or protocols provided by SOOF infrastructure objects of the present invention may be utilized with respect to resources internal to application framework 101, or otherwise in the application container. For example, an SOOF infrastructure object of embodiments of the invention may provide an interface between a plurality of independent SOOF service objects, such as to facilitate interaction between different application programs within application framework 101. Accordingly, even where an application has been developed (e.g., using a SOOF business object and a plurality of SOOF service objects) which did not anticipate interaction with another application, interaction may be accommodated through an interface and/or protocols of an appropriate SOOF infrastructure object.

Also shown in the SOOF infrastructure embodiment of FIG. 2 is SOOF framework 21. SOOF framework 21 of embodiments provides services and utilities that facilitate an object hierarchy, as described above, existing on top of SIP application server platform 16. The illustrated embodiment of SOOF framework 21 includes object and interface registry 201, security 202, event routing 203, platform resource marshalling 204, and session coordination and distribution 205. The foregoing elements preferably cooperate to facilitate the above described object hierarchy.

Preferred embodiments of SOOF framework 21 provide object management. For example, object management provided by an embodiment of SOOF framework 21 controls the way the objects are loaded onto the platform and the interface that those objects use to register their functions with the framework. Object and interface registry 201 of the illustrated embodiment is a repository for registration of the objects. According to an embodiment, the objects interact with object life management function of object and interface registry 201, passing thereto the object functions, the object interfaces, and the events that the object supports.

Security 202 provides functions for managing access to the applications and services contained within the SOOF environment according to security infrastructure and guidelines supported by a service provider's infrastructure. A plurality of security models are preferably provided for. For example, an embodiment of the present invention provides for platform wide and service specific security models. Platform wide security may, for example, provide the capability of generating or accepting security certificates from other platforms within a service providers infrastructure, identifying the SOOF infrastructure as a trusted element. Such a security model provides a mechanism to enable all applications or services hosted within the SOOF environment to communicate with any application or service on an external trusted element. Service specific security may, for example, provide a mechanism to verify connections between individual services or applications built within the SOOF environment to individual external applications or service platforms.

Event routing 203 of embodiments facilitates objects requesting notification of occurrences of external events, such as events associated with network elements of network 11. Examples of external events include an inbound call coming into the platform, pressing a DTMF digit on a telephone, etcetera. Functions of one or more of the objects operating in the application framework may be based upon external stimulus. Accordingly, applications operating in application environment 101 may benefit from receiving notification of external events that interact with the platform. Event routing 203 of the illustrated embodiment routes notification of external events, and preferably information associated with the external events, to an object or objects that have requested notification of the particular event. In operation according to an embodiment, as an object is loaded onto the platform, object and interface registry 201 is provided information regarding the events which are handled by the object. Object and interface registry 201 of the illustrated embodiment interacts with event routing 203 to load event notification information thereto (e.g., as part of the act of loading a new SOOF object into the SOOF environment). Event routing 203 makes determinations when events occur as to which object or objects to notify, and preferably determines an order of objects to notify of the occurrence of an event.

Platform resource marshaling 204 of an embodiment operates to insure the stability of applications on the platform and isolate faults from disturbing other SOOF objects in the environment. Development platforms conventionally operate to enable use of system resources, such as memory, threads, and timers, in such a way that, if the system has allocated all the resources, a potential exists for the application to crash, perhaps bringing down all applications on the platform. In contrast, platform resource marshaling 204 of embodiments of the invention inventories and monitors resource usage, tracks which applications and which elements within a platform are making use particular resources, and gracefully restricts access to the resources when a particular resource is not available for allocation.

Session coordination and distribution 205 of embodiments of the invention facilitates scaling of the platform. Typically, when a SIP application server is deployed it exists within a single instance of a physical server which has a limited capacity associated therewith. However, embodiments of the present invention are adapted to provide scalability such that when a deployment exceeds a given capacity, or it is otherwise desirable to extend capacity, additional servers may be deployed, having SIP application server platforms and SOOF frameworks thereon, as a cluster. SOOF infrastructure objects of embodiments of SOOF development and deployment framework 20 include protocol session management in order to facilitate distributing session information among multiple servers of a cluster. Session coordination and distribution 205 of the illustrated embodiment, cooperating with SOOF infrastructure objects 20-1 through 20-P, logically manages the SIP application server platforms as one logical application server within the cluster. According to a preferred embodiment, in order to make sure that each physical server of a cluster has access to every protocol session that exists within the cluster, session coordination and distribution 205 communicates with the other servers of a cluster to ensure that each server is aware of sessions that exist on other servers of the cluster.

In operation according to embodiments of system 10 illustrated in FIG. 2, objects utilize object and interface registry 201 in order for an object to connect and make use of another object. Objects may utilize object and interface registry 201 to find out where that other object is within the cluster. For example, service object 12-1 may wish to interface with an infrastructure object and thus may request, through object and interface registry 201, an infrastructure object to provide a particular function. Object and interface registry 201 knows which infrastructure objects provide the desired function and where those infrastructure objects are located. Accordingly, object and interface registry 201 of an embodiment passes a handle or a reference to a particular infrastructure object (e.g., infrastructure object 20-1, to service object 12-1 to make use of. Service object 12-1 may interact with object and interface registry 201 in order to implement a particular aspect of the infrastructure object. For example, service object 12-1 may indicate to object and interface registry 201 that service object 12-1 would like to invoke a specific interface of infrastructure object 20-1. Object and interface registry 201 of a preferred embodiment passes a handle back to service object 12-1 for the requested interface of infrastructure object 20-1. Service object 12-1 of this exemplary embodiment now has everything it needs to connect to infrastructure object 20-1 and perform a desired function. Accordingly, future interactions between service object 12-1 and infrastructure object 20-1 may be provided directly therebetween, without arbitration by object and interface registry 201. However, if one of service object 12-1 or infrastructure object 20-1 require additional functionality, e.g. available through the other one of these objects or other objects within application framework 101, requests may be provided to object and interface registry 201 to acquire the appropriate handles. It should be appreciated that the foregoing accommodates interaction between objects of a physical server as well as objects of a plurality of physical servers (e.g., a cluster). Moreover, the foregoing accommodates interaction between objects of objects disposed within a same container as well as objects of a plurality of containers.

Although preferred embodiments operate at a low level to provide arbitration between objects as outlined in the exemplary embodiment set forth above, embodiments of the invention provide a mechanism to hide the complexities of how these objects interact with each other from developers, such as developers of business objects, service objects, and/or infrastructure objects. For example, SOOF framework 21 of preferred embodiments facilitates high level function calls such that calls between objects appear to a developer, such as a service object developer, as if a function call is made to another object, such as an infrastructure object. Where the objects are disposed on the same server and in the same container, the underpinnings of the mechanism establish a direct function call between the objects. However, if the objects are disposed on different servers, the mechanism translates the call into an appropriate protocol, such as an internet protocol, call between the objects.

The foregoing elements of embodiments of the present invention may be implemented in software as code segments to perform the above described tasks. The program or code segments can be stored in a computer readable medium or transmitted by a computer data signal embodied in a carrier wave, or a signal modulated by a carrier, over a transmission medium. The computer readable medium may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:
defining a multiple object hierarchy for providing an open application environment;
providing, in said open application environment, a first plurality of program objects associated with a first object hierarchy level of said multiple object hierarchy;
providing, in said open application environment, a second plurality of program objects associated with a second object hierarchy level of said multiple object hierarchy;
associating selected ones of said first plurality of program objects and selected ones of said second plurality of program objects to form an application program, wherein the application program provides a first telephony service, wherein said second plurality of program objects comprise infrastructure objects providing foundational element blocks embodying protocol specific functions of services provided by said application program;
wherein said associated selected ones of said first plurality of program objects and selected ones of said second plurality of program objects comprises:
providing an application framework having a plurality of utilities facilitating interaction between said selected ones of said first plurality of program objects and said selected ones of said second plurality of program objects; and
passing object function information with respect to at least one of said first and second plurality of program objects to an object life management utility of said application framework upon a corresponding one of said program object being loaded into said open application environment.

2. The method of claim 1, wherein said multiple object hierarchy comprises a business object level, a service object level, and an infrastructure object level.

3. The method of claim 1, wherein said first plurality of program objects comprise business objects, said business objects providing application orchestration to define said application program created by combining objects of said second plurality of program objects.

4. The method of claim 1, wherein said first plurality of program objects comprises business objects, said business objects providing bridging of services into a web services application infrastructure.

5. The method of claim 1, wherein said first plurality of program objects comprise service objects, said service objects providing service level functions utilizing one or more objects of said second plurality of program objects to fulfill its function.

6. The method of claim 5 wherein said service objects are exported directly to a web services infrastructure for orchestration into logical applications formed at a web services infrastructure layer of a service provider application infrastructure.

7. The method of claim 1, further comprising:
providing, in said open application environment, a third plurality of program objects associated with a third object hierarchy level of said multiple object hierarchy.

8. The method of claim 7, wherein said associated selected ones of said first plurality of program objects and selected ones of said second plurality of program objects comprises:
associating selected ones of said first plurality of program objects, selected ones of said second plurality of program objects, and selected ones of said third plurality of programs objects to form an application program.

9. The method of claim 1, further comprising:
storing information regarding functions performed by objects of at least one of said first and second plurality of program objects in a registry of said application framework upon a corresponding one of said program object being loaded into said open application environment.

10. The method of claim 1, further comprising:
storing information regarding external events objects of at least one of said first and second plurality of program objects are to receive notification of in a registry of said application framework upon a corresponding one of said program object being loaded into said open application environment.

11. The computer implemented method as in claim 1, wherein
associating at least one of the selected ones of said first plurality of program objects to form a second application program, the second application program providing a second telephony service, the first telephony service different than the second telephony service.

12. The computer implemented method as in claim 11, wherein associating at least one of the selected ones of said first plurality of program objects to form the second application program includes:
sharing a respective single instance of a selected program object, of said first plurality of program objects, between the first telephony service and the second telephony service.

13. The computer implemented method as in claim 12, wherein sharing the respective single instance of the selected program object includes:
receiving at least one update of the respective single instance of the selected program object, the at least one update comprising a bug fix; and
implementing the at least one update in the first telephony service and the second telephony via the particular single instance of selected program object.

14. The computer implemented method as in claim 13, wherein receiving the at least one update includes:
receiving a fix to an instance of an audio mix operation shared between an implementation of the first telephony service and an implementation of the second telephony service.

15. The computer implemented method as in claim 14, wherein the first telephony service comprises an audio conferencing application and the second telephony service comprises a call recording application.

16. A system comprising:
a memory;
a processor;
a communications interface;
an interconnection mechanism coupling the memory, the processor and the communications interface;
defining a multiple object hierarchy for providing an open application environment;
providing, in said open application environment, a first plurality of program objects associated with a first object hierarchy level of said multiple object hierarchy;
providing, in said open application environment, a second plurality of program objects associated with a second object hierarchy level of said multiple object hierarchy;
associating selected ones of said first plurality of program objects and selected ones of said second plurality of program objects to form an application program, wherein the application program provides a first telephony service, wherein said second plurality of program objects comprise infrastructure objects providing foundational element blocks embodying protocol specific functions of services provided by said application program;
wherein said associated selected ones of said first plurality of program objects and selected ones of said second plurality of program objects comprises:
providing an application framework having a plurality of utilities facilitating interaction between said selected ones of said first plurality of program objects and said selected ones of said second plurality of program objects; and passing object function information with respect to at least one of said first and second plurality of program objects to an object life management utility of said application framework upon a corresponding one of said program object being loaded into said open application environment.

17. The system of claim 16, wherein said multiple object hierarchy comprises: a business object level; a service object level; and an infrastructure object level, wherein the multiple object hierarchy is defined with respect to a session initiation protocol (SIP) container, wherein the application framework is operable with respect to said SIP container and comprises a plurality of utilities facilitating interaction between objects of said object hierarchy.

18. The system of claim 17, wherein said application framework comprises at least one of: an object registry, an object life management utility, an external event routing utility, a session coordination utility, a resource marshalling utility and a security utility.

19. The system of claim 17, wherein a business object of said business object level defines an application program operable in said SIP container by combining a plurality of service objects of said service object level.

20. The system of claim 19 wherein said service objects are exported directly to a web services infrastructure for orchestration into logical applications formed at a web services infrastructure layer of a service provider application infrastructure.

21. A non-transitory computer readable storage medium comprising executable instructions encoded thereon operable on a computerized device to perform processing comprising at least one instruction for:
defining a multiple object hierarchy for providing an open application environment;
providing, in said open application environment, a first plurality of program objects associated with a first object hierarchy level of said multiple object hierarchy;
providing, in said open application environment, a second plurality of program objects associated with a second object hierarchy level of said multiple object hierarchy;
associating selected ones of said first plurality of program objects and selected ones of said second plurality of program objects to form an application program, wherein the application program provides a first telephony service, wherein said second plurality of program objects comprise infrastructure objects providing foundational element blocks embodying protocol specific functions of services provided by said application program;
wherein said associated selected ones of said first plurality of program objects and selected ones of said second plurality of program objects comprises:
providing an application framework having a plurality of utilities facilitating interaction between said selected ones of said first plurality of program objects and said selected ones of said second plurality of program objects; and passing object function information with respect to at least one of said first and second plurality of program objects to an object life management utility of said application framework upon a corresponding one of said program object being loaded into said open application environment.

22. The non-transitory computer readable storage medium of claim 21, wherein said multiple object hierarchy comprises a business object level, a service object level, and an infrastructure object level.

23. The non-transitory computer readable storage medium of claim 21, wherein said first plurality of program objects comprise business objects, said business objects providing application orchestration to define said application program created by combining objects of said second plurality of program objects.

24. The non-transitory computer readable storage medium of claim 21, wherein said first plurality of program objects comprises business objects, said business objects providing bridging of services into a web services application infrastructure.

25. The non-transitory computer readable storage medium of claim 21, wherein said first plurality of program objects comprise service objects, said service objects providing service level functions utilizing one or more objects of said second plurality of program objects to fulfill its function.

26. The non-transitory computer readable storage medium of claim 21, further comprising at least one instruction for:
providing, in said open application environment, a third plurality of program objects associated with a third object hierarchy level of said multiple object hierarchy.

27. The non-transitory computer readable storage medium of claim 26, wherein said associated selected ones of said first plurality of program objects and selected ones of said second plurality of program objects comprises at least one instruction for:
associating selected ones of said first plurality of program objects, selected ones of said second plurality of program objects, and selected ones of said third plurality of programs objects to form an application program.

28. The non-transitory computer readable storage medium of claim 21, further comprising at least one instruction for:
storing information regarding functions performed by objects of at least one of said first and second plurality of program objects in a registry of said application framework upon a corresponding one of said program object being loaded into said open application environment.

29. The non-transitory computer readable storage medium of claim 21, further comprising at least one instruction for:
storing information regarding external events objects of at least one of said first and second plurality of program objects are to receive notification of in a registry of said application framework upon a corresponding one of said program object being loaded into said open application environment.

* * * * *